United States Patent [19]

Metcalfe

[11] Patent Number: 5,809,181
[45] Date of Patent: Sep. 15, 1998

[54] COLOR CONVERSION APPARATUS

[75] Inventor: James Robert Metcalfe, Collarooy Plateau, Australia

[73] Assignees: Canon Information Systems Research Australia Pty. Limited, North Ryde, Australia; Canon Kabushiki Kaisha, Tokyo, Japan

[21] Appl. No.: 678,947

[22] Filed: Jul. 12, 1996

Related U.S. Application Data

[63] Continuation of Ser. No. 204,085, Mar. 2, 1994, abandoned.

[30] Foreign Application Priority Data

Mar. 8, 1993 [AU] Australia ................ PL7675

[51] Int. Cl.⁶ ...................................... H04N 1/60
[52] U.S. Cl. ................. 382/276; 382/167; 358/523; 358/525
[58] Field of Search .................... 382/162, 167, 382/276; 358/518, 519, 523, 525

[56] References Cited

U.S. PATENT DOCUMENTS

| | | | |
|---|---|---|---|
| 3,875,587 | 4/1975 | Pugsley | 358/80 |
| 3,893,166 | 7/1975 | Pugsley | 358/80 |
| 4,275,413 | 6/1981 | Sakamoto et al. | 358/80 |
| 4,282,578 | 8/1981 | Payne et al. | 364/573 |
| 4,334,240 | 6/1982 | Franklin | 358/525 |
| 4,460,958 | 7/1984 | Christopher et al. | 364/200 |
| 4,477,833 | 10/1984 | Clark et al. | 358/80 |
| 4,590,515 | 5/1986 | Wellendorf | 358/75 |
| 4,837,722 | 6/1989 | Sara | 364/723 |
| 5,018,008 | 5/1991 | Asada | 358/518 |
| 5,057,931 | 10/1991 | Nomakura et al. | 358/518 |

FOREIGN PATENT DOCUMENTS

| | | | |
|---|---|---|---|
| 5-63967 | 12/1993 | Japan | H04N 1/40 |
| 2050751 | 1/1981 | United Kingdom | H04N 1/46 |
| 2073987 | 10/1981 | United Kingdom | H04N 1/46 |
| 03900 | 12/1991 | WIPO | G06F 15/353 |
| WO9206557 | 4/1992 | WIPO | H04N 1/46 |

OTHER PUBLICATIONS

"Color Rendition Using Three–Dimensional Interpolation" by Po Chieh Hung published in SPIE vol. 900 Imaging Applications in the Work World (1988) at pp. 111–115.

"Table–lookup/Interpolation Function Generation for Fixed–Point Digital Computations", by H.M. Aus and G.A. Korn, IEEE Transactions on Computers vol. 18, No. 8, Aug. 1969, pp. 745–749.

"Transformng Digital Images in Real Time", Joel Dedrick, published in Electronic System Design Magazine, Aug. 1987, p. 27.

"Colorimetric Calibration In Electronic Imaging Devices Using a Look–up—Table Model and Interpolations", Journal of Electronic Imaging, vol. 2, No.1, Jan. 1993, Bellingham, WA, US, pp. 53–61, XP355272, Po–Chieh Hung.

*Primary Examiner*—Christopher S. Kelley
*Attorney, Agent, or Firm*—Fitzpatrick, Cella, Harper & Scinto

[57] ABSTRACT

A colour conversion apparatus maps image data from an input colour space (RGB) to an output colour space (CMYK). A transfer function between the colour spaces is known relevant to an appropriate display medium such as a printer and this is divided into intervals for interpolating between the colour spaces. The intervals vary in length depending on the behavior of the transfer function with the intervals being shorter where the transfer function is not well behaved (i.e. rapid change in slope). Interpolation is performed over each interval based on mapping a volume of input pixel data to a corresponding volume of a component of output pixel data. Interpolation is performed between those points to derive an output pixel colour component value. The process is repeated for each primary colour component of the output colour space to produce composite output pixels. Near-white and near-black colour correction is also performed.

38 Claims, 13 Drawing Sheets

COLOR CONVERSION APPARATUS

This application is a continuation of application Ser. No. 08/204,085, filed Mar. 2, 1994, now abandoned.

The present invention relates to the display of colour images on a display device and in particular, the display of colour images by a colour printing device.

BACKGROUND OF THE INVENTION

Background art will now be described with reference to the following drawings in which:

FIG. 1 illustrates an ideal colour relationship; and

FIG. 2 illustrates a more realistic colour relationship which occurs in practice.

Images are normally displayed by a CRT type display using an additive format such as the Red, Green, Blue (RGB) format. In this format, separate colour information is provided for each of the Red, Green and Blue primary colours and when displayed together, they form any desired colour to be displayed.

However, when it is desired to print out a colour representation of the image displayed by a colour display, a subtractive colour format is generally used. One such subtractive format is the Cyan, Magenta, Yellow and Black (CMYK) format. Such a subtractive format is commonly used in colour printing devices and in particular is used in the Canon CLC500 colour laser copier/printer manufactured by Canon Inc.

Referring now to FIG. 1 there is shown an ideal colour relationship. In theory the relationship between additive colours and subtractive colours is simple, as Cyan, Magenta and Yellow are simply the complementary colours to Red, Green and Blue respectively. They can be expressed by:

$$C=1-R; \quad (EQ\ 1)$$

$$M=1-G;\ and \quad (EQ\ 2),$$

$$Y=1-B. \quad (EQ\ 3)$$

Black (K) is a function of all three additive primaries as follows:

$$K=rR+gG+bB. \quad (EQ\ 4)$$

where r, g, and b are coefficients determined by relative human perception of red, green and blue.

Referring now to FIG. 2 there is shown a more realistic colour relationship which occurs in practice. In practice the above equations are inadequate and the amount of cyan for example is a complex non-linear equation that depends on the amount of red, green, and blue. Non-linear transfer functions in the printing mechanism require a non-linear transfer function during conversion between the two colour formats. FIG. 1 shows the ideal curve for (say) cyan, whereas the curve shown in FIG. 2 is that required by the printer.

One method for performing colour correction in accordance with the arrangement shown in FIG. 2 would be to use a number of programmable read only memories (PROM's) to perform a lookup of each possible input point and a preprogrammed function similar to that shown in FIG. 2.

However this solution has a number of disadvantages. Namely:

(i) it may require a large amount of board space due to the number of support chips required by the PROMs;

(ii) it requires a large amount of power where high speed PROMs are used; and (iii) it requires a large amount of storage space, with one value stored for each possible primary colour value with say 8 bits for each colour of red, green and blue and each mapping producing 8 bits of output, the total storage space would be $2^8 \times 2^8 \times 2^8$, being over 16 Mbytes for each colour pass.

Another method is to use matrix multiplication to calculate a linear approximation to the required value, however, this also has a number of disadvantages, such as:

(i) the resulting quality of linear blends between colours is too low for computer generated graphics; and (ii) any errors introduced by the colour conversion process are quite noticeable in areas of gradual blend between colours. This is particularly bad in luma ramps from black to white, where false colours appear. "Banding" effects are exaggerated by any printer that fails to use the full level information provided by the primary colour input level values. Such printers are in common use.

It is an object of the present invention to substantially overcome, or ameliorate at least one of the aforementioned difficulties with the prior art.

SUMMARY OF THE INVENTION

In accordance with one aspect of the present invention, there is provided a method for converting an input image in an input colour space to an output image in an output colour space, each of said images comprising a plurality of pixels comprised of primary colour components of the respective colour space, said method comprising the steps of:

dividing at least one primary colour of said output colour space into a number of output colour space intervals, determining corresponding input colour space intervals from said output colour space intervals, using the endpoints of said corresponding input colour space intervals as interpolation points, determining, for each pixel in the input image, the closest interpolation points, and interpolating between said interpolation points to derive a component of an output pixel value in said output colour space.

Preferably, the interpolating step further includes determining a distance measure of the output pixel component from at least one of said closest interpolation points by means of a lookup table. Also preferably, the output colour space intervals vary in length depending on the behaviour of the transfer function between the two colour spaces.

In accordance with another aspect of the present invention, there is provided a method of determining the endpoints of an interpolation interval for use in conversion of an input image in an input colour space to an output image in an output colour space, said method comprising the steps of:

dividing at least one primary colour of said input colour space into a number of intervals, storing the endpoints of said intervals, resolving said intervals into a multitude of groups, with adjacent intervals being resolved into different groups, determining which of said groups comprises a selected one of said intervals having a preselected pixel of said image, and retrieving said endpoints of said selected one interval using an offset addressing variable between each one of the groups.

BRIEF DESCRIPTION OF THE DRAWINGS

A preferred embodiment of the present invention will now be described with reference to the accompanying drawings in which.

DETAILED DESCRIPTION OF THE PREFERRED EMBODIMENT

Figure 3:
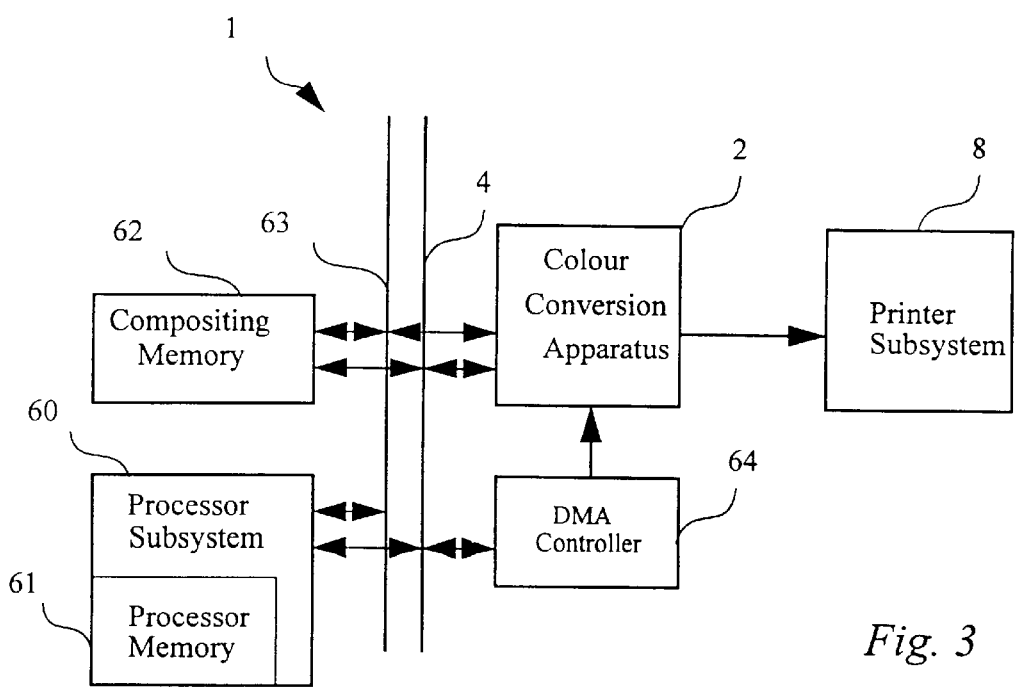
FIG. 3 illustrates a colour processing system incorporating the preferred embodiment of the present invention.

Referring now to FIG. 3, a colour conversion apparatus 2 of the preferred embodiment is designed to form part of a colour image processing system 1 similar to that set out in Australian Patent Application No. 81782/91 of 16 Aug. 1991 (Attorney Ref: (Page+2)(186264)(CFP013AU)). However, applications of the present embodiment are not limited thereto.

FIG. 3 shows a simplified block diagram of the colour image processing system 1 used in a typical application, and configured to operate on a standard computer system. The colour conversion apparatus 2 interacts with two main subsystems:

The first is a processor subsystem 60, which includes in particular a processor memory 61. Colour conversion tables required for each colour pass are established in the processor memory 61. The colour image processing system 1 loads the colour conversion table required for each colour pass (C, M, Y or K) at the beginning of a conversion pass. These can be loaded either via normal write cycles to the processor memory 61 or under control of a DMA master controller 64. Adjunct to the processor subsystem 60 is a compositing memory 62 and a corresponding compositing bus 63.

The second is a printer subsystem 8. The C,M,Y or K value resulting from interpolating the colour conversion table by the colour conversion apparatus 2 will be output to the printer subsystem 8 by the colour conversion apparatus 2.

Processor input/output (I/O) to and from the colour conversion apparatus 2 is performed by processor bus interface subsystem 3 via a processor bus 4 in synchronization with the processor clock. I/O to and from the printer subsystem 8 is synchronized with the pixel clock of the relevant printer subsystem. An example printer subsystem 8 for use with the preferred embodiment of the present invention is Canon's CLC500 colour printer.

Figure 4:
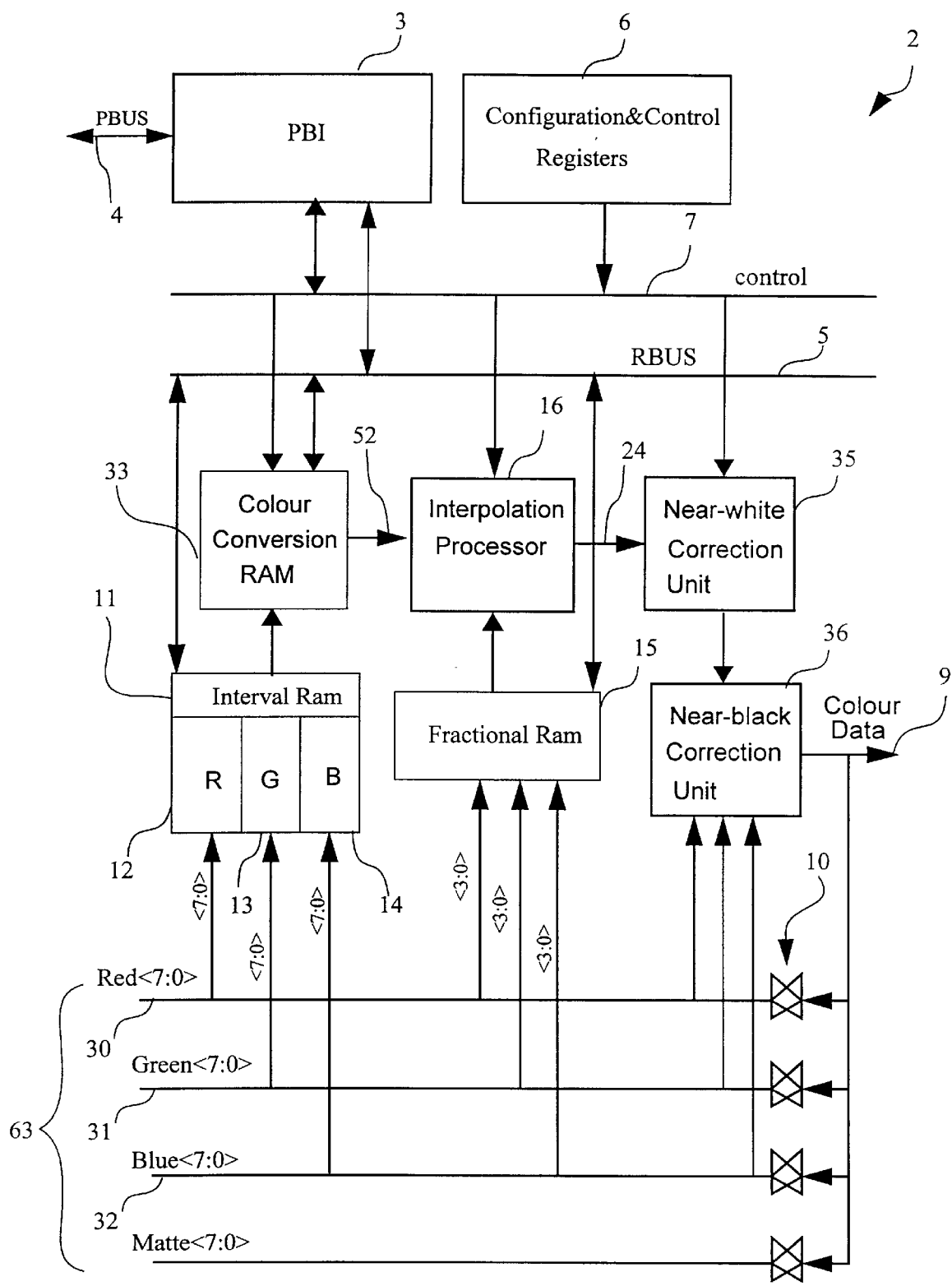
FIG. 4 illustrates the basic structure of a colour conversion apparatus of the preferred embodiment.

Referring now to FIG. 4 there is shown the basic structure of a colour conversion apparatus of the preferred embodiment The modules in colour conversion apparatus 2 form a processing pipeline which accept a stream of RGB pixel data from the compositing bus 63 and pass it along the processing pipeline to generate the appropriate colour conversion data for output to the printer interface.

Interface of the colour conversion apparatus 2 to the processor bus 4 is controlled by he processor bus interface subsystem 3. The processor bus interface subsystem 3 interfaces the processor bus 4 to an internal register bus 5 for register read and write cycles, and processor DMA accesses to internal RAM within the colour conversion apparatus 2.

Configuration and control of colour conversion apparatus 2 is achieved by reading and writing internal configuration and control registers 6 of the colour conversion apparatus 2 which generates control information 7 from those registers for the colour conversion apparatus 2.

Each of the internal memories are dual ported (not necessarily physically but functionally by means of the processor mode bit in the configuration and control registers 6), with a port assigned to the execution pipeline of the colour conversion apparatus 2 and a port assigned to the register bus 5. The port assigned to the register bus 5 is used for the loading of each internal memory before each colour pass of the printer subsystem 8.

Three distinct operations are performed by colour conversion apparatus 2, those being colour conversion, near-white correction performed by a near white correction unit 35, and text detect edge enhancement performed by a near black correction unit 36. The resulting output data 9 is the RGB to CMYK colour conversion required by the relevant printing device.

The output data 9 can be returned back to the compositing memory 62 by an arrangement of bi-directional buffers 10.

A non-uniform colour space conversion interval RAM 11 is advantageously provided to improve the colour conversion process. The non-uniform colour space conversion interval RAM 11 comprises separate interval RAM's 12, 13, 14 which are loaded for each colour pass and each provide a one to one transformation mapping for each of the Red, Green and Blue channels of input.

Referring now to FIG. 4 to FIG. 7, the operation of the red interval RAM 12 will now be described, with the green interval RAM 13 and blue interval RAM 14 operating in a corresponding manner.

Figure 1:
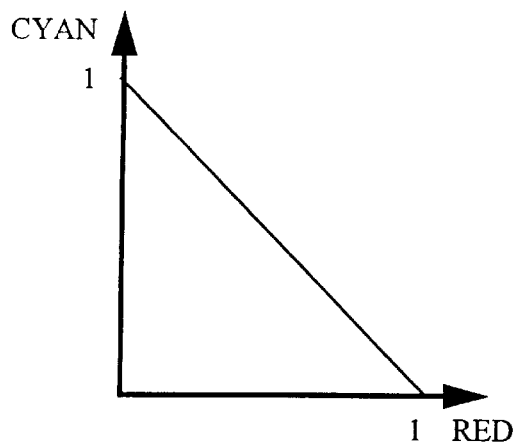
FIG. 1 is a graph of an ideal curve for converting red to cyan.
Figure 2:
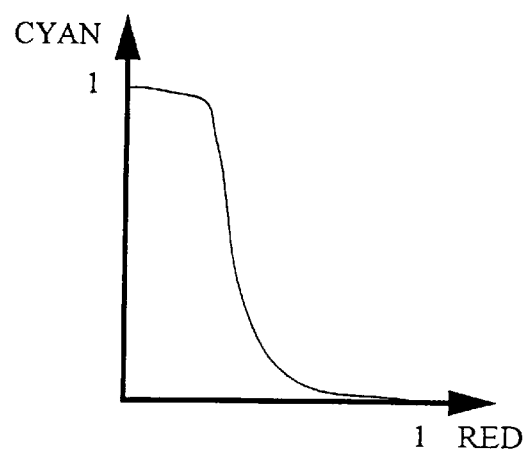
FIG. 2 is a graph of a curve for converting red to cyan for a printer.

As will be further described below, so as to reduce the amount of storage required by the colour conversion apparatus 2, methods of interpolation are used to derive the final output colour. A basic explanation of the interpolation process will be described in relation to one colour, the interpolation being carried out, for example, between two derived cyan values derived from the graph of FIG. 2.

Figures 5, 6:
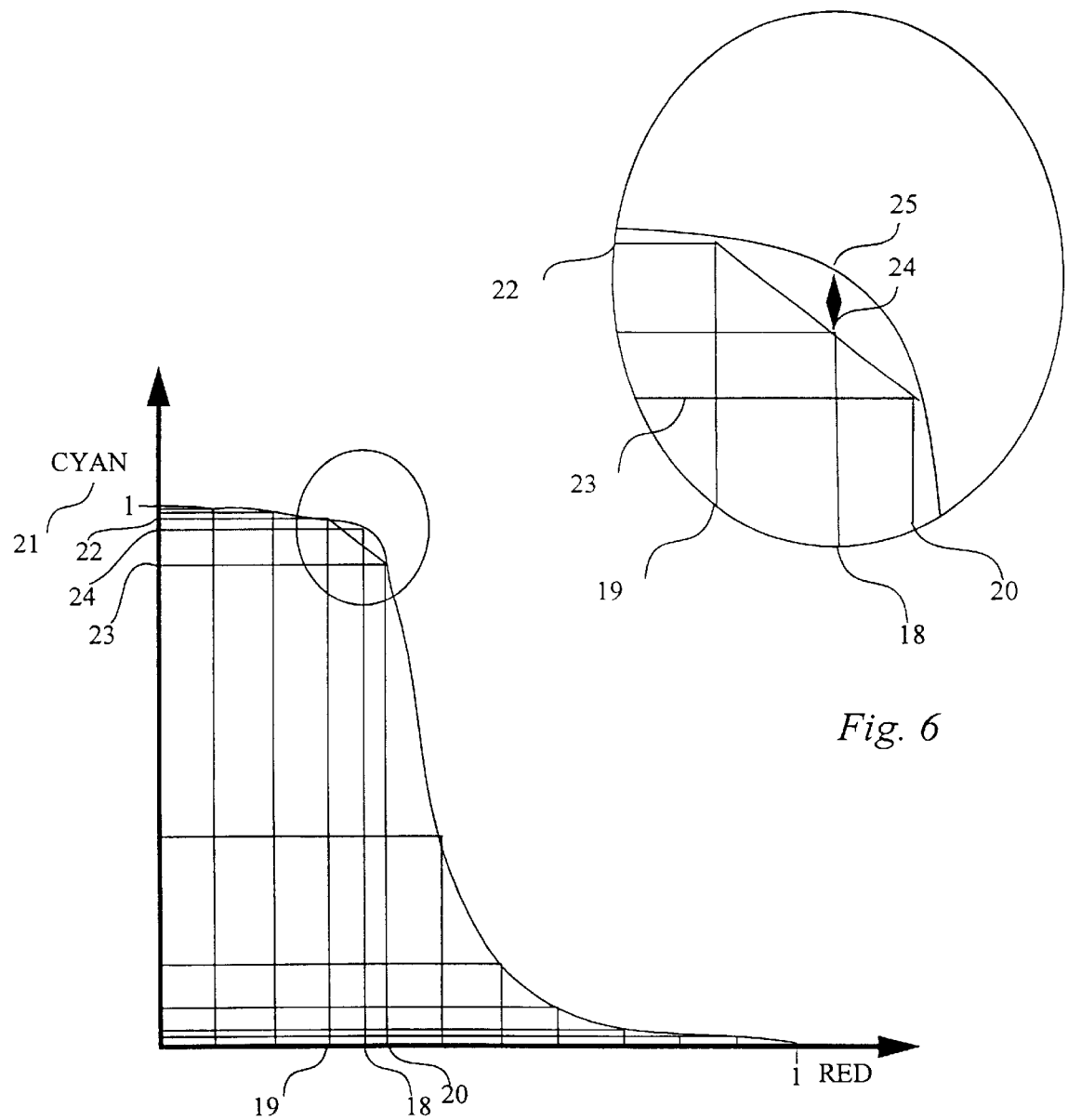
FIG. 5 illustrates the normal colour conversion process of FIG. 2.
FIG. 6 illustrates an enlarged portion of FIG. 5

Referring to FIG. 5 and FIG. 6, an example of a first method of interpolation of values. In this method, it is desired to determine the cyan component of a red input data point 18. In order to do this, the scale of red values is broken up into a number of predefined substantially equal intervals and the closest two of these intervals is used for the interpolation process. Hence a lower red reference point 19 and an upper red reference point 20 are determined, their corresponding first cyan value 22 and second cyan value 23 are determined and these two points are used as interpolation points in order to determine a final interpolated value 24.

However, as can be seen from FIG. 6, there can be substantial inaccuracies in certain intervals between the final interpolated value 24 and the required cyan value 25. Thereby outputting incorrect results, especially where the red to cyan curve is not well behaved. This means that the interpolation process can have a high degree of accuracy in some intervals and a substantially lower degree of accuracy in other intervals.

Figures 7, 8:
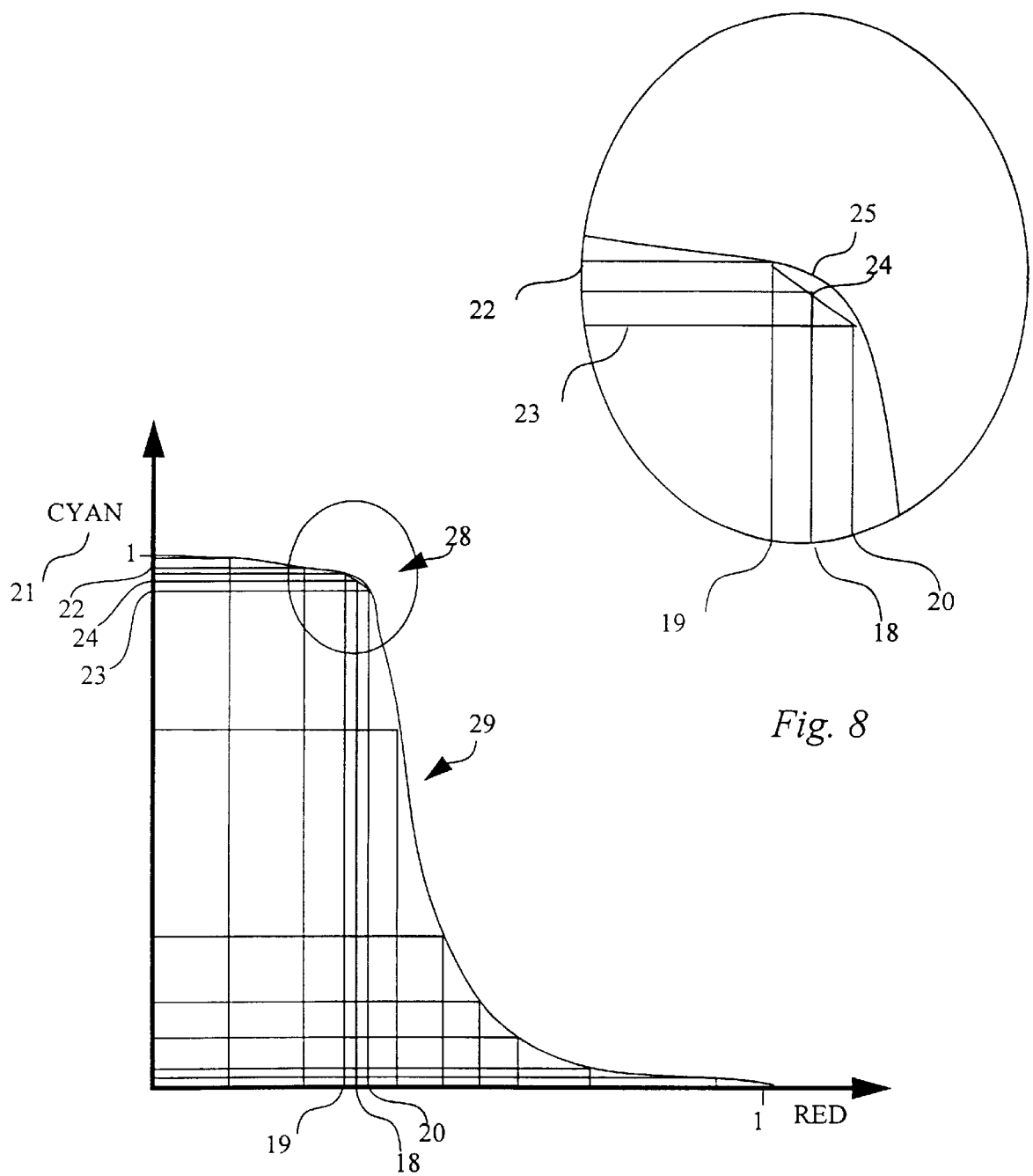
FIG. 7 illustrates the colour conversion process of the red interval RAM of FIG. 4
FIG. 8 illustrates an enlarged portion of FIG. 7

In FIG. 7 and FIG. 8, a more ideal form of interpolation between cyan values 21 whereby the interpolation points are judiciously placed so as to minimize the error between the final interpolated value 24 and the required cyan value 25.

The placement of interpolation points can be determined by the nature of the particular conversion curve, with a high number of points placed around points around areas of the curve that are not well behaved. In this case, the interpolation intervals are substantially shorter where the rate of change of the gradient of the curve is greatest (i.e. not well behaved). In particular, the length of the output colour space intervals between the interpolation points is shorter at and about locations where the transfer function undergoes a relatively rapid change in slope. Further, the length of the output colour space intervals is adjusted so that the magnitude of the change in slope of the transfer function between adjacent ones of the output colour space intervals is less than a predetermined value.

A red interval RAM 12 is responsible for rescaling or remapping the set of input points of FIG. 5 to FIG. 7. This has the effect of shortening the distance between interpolation points in each badly behaved area of colour conversion curve 28 and lengthening the distance between interpolation points in each well behaved area of the colour conversion curve 29. A well behaved portion of the curve being one that has a substantially linear relationship between input red values and output cyan values.

In colour conversion apparatus 2 of the preferred embodiment, the red axis is divided into 15 intervals, giving 16 interval endpoints, and the non-uniform colour space conversion interval RAM 11 accepts 24-bit RGB pixel information in the form of 8-bits for each of the red input 30, green input 31 and blue input 32. Each interval RAM 12, 13, 14 performs the abovementioned interval determination and outputs a 4 bit key corresponding to the division of each input colour into one of 16 intervals. The 4-bit key is derived from an analysis of the behaviour of the transfer curve for the particular printer subsystem 8, and is pre-loaded into the non-uniform colour space conversion interval RAM 11. These 4 bit interval key values are concatenated together to form a 12-bit address for accessing a colour conversion RAM 33. The 12-bit address is used by the colour conversion RAM 33 to determine the eight vertices of a cube in RGB space which encloses the input pixel.

The non-uniform colour space conversion interval RAM 11 can be viewed as a three array of 8-bit data with the red index changing most frequently, followed by the green index and then the blue index (For example, for simulation in the C programming language, this would be declared as char Color_Table[blue][green][red], where red, green and blue are in the range 0 to 15). The red interval RAM 12 contains 256 4-bit interval values at addresses 0×1000 to 0×10FF. The green interval RAM 13 contains 256 4-bit interval values at addresses 0×1100 to 0×11FF. The blue interval RAM 14 contains 256 4-bit interval values at addresses 0×1200 to 0×12FF. Data is ordered from lowest interval to highest interval.

Figure 9:
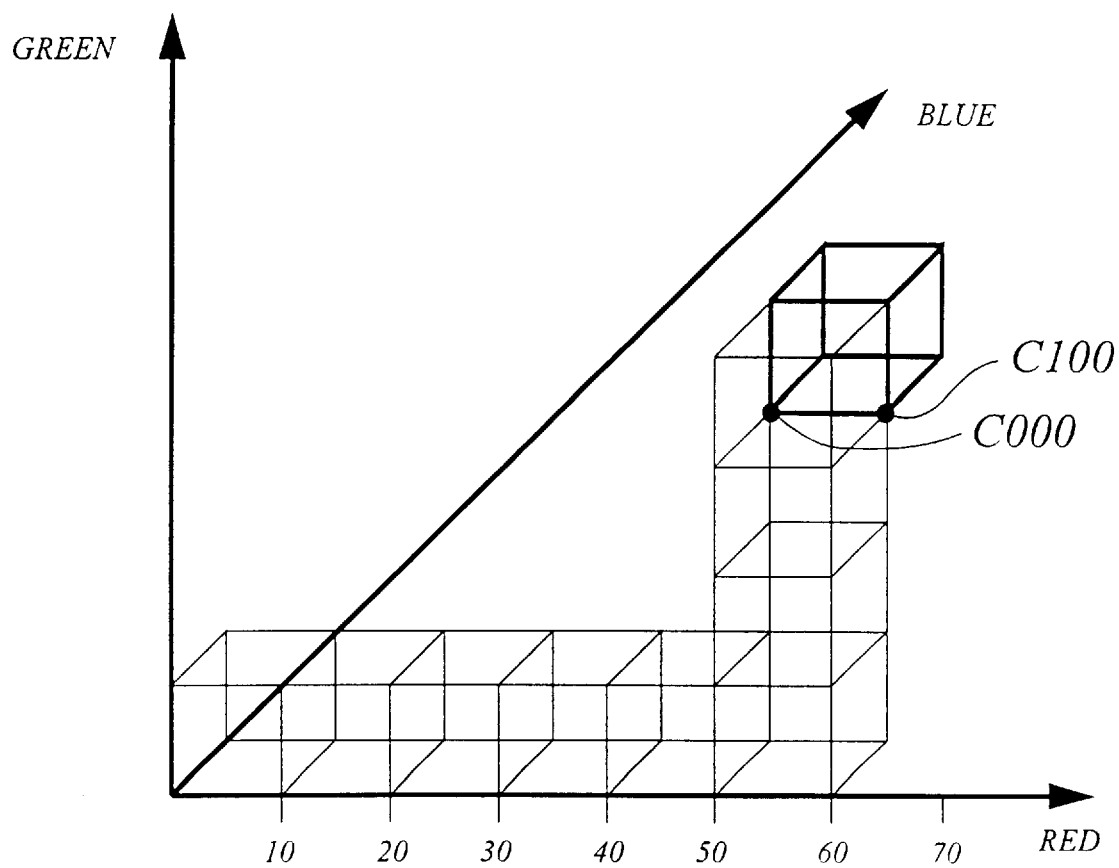
FIG. 9 illustrates the process of finding a sample colour point within a 3-dimensional colour space.

Referring now to FIG. 9, there is shown the method of determining the relevant toner amount used in the next step of the conversion process carried out by the colour conversion RAM 33. The colour conversion RAM 33 is loaded with the appropriate output colour space primary colour lookup table by the processor bus interface subsystem 3 via the register bus 5 before each colour pass of the printer (CMYK) to contain 4096 colour conversion values at addresses 0×0000 to 0×0FFF. The 12-bit address from the non-uniform colour space conversion interval RAM 11 is used to select eight of the 4096 values as the vertices of the cube.

Figure 10:
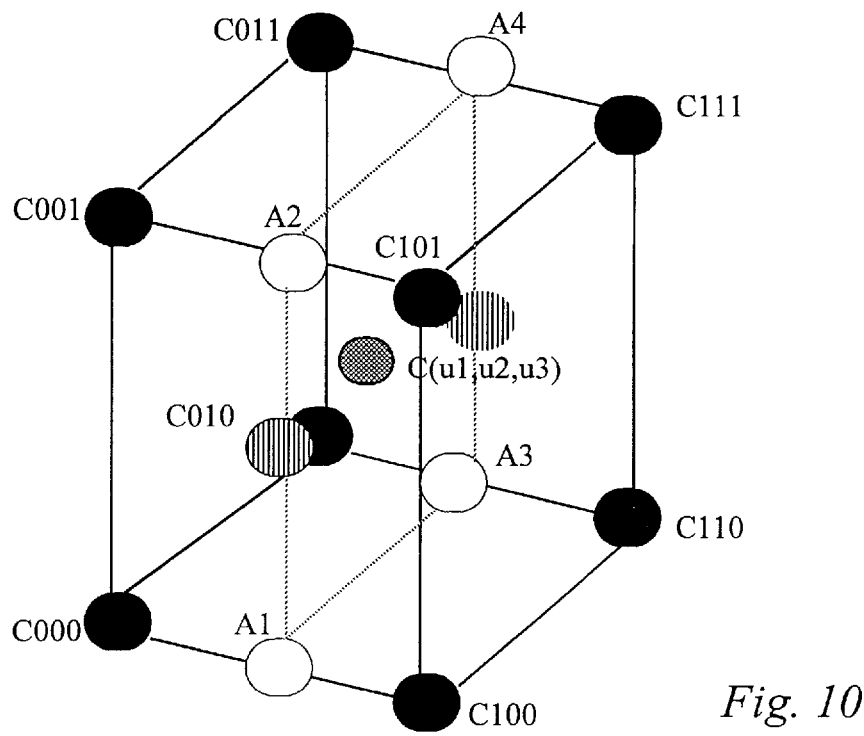
FIG. 10 illustrates an example of interpolation of a point within a cube.

This process is used by the preferred embodiment to minimize the storage requirements. For example, assuming that each primary colour has 256 (8-bits) possible levels of input, a lookup table for every combination of R, G, and B would require 16 Mbytes (256×256×256) for each of the CMY and K pass. A large lookup table can be simulated by interpolating between eight points forming a cube around the R,G,B position derived from the non-uniform colour space conversion interval RAM 11. Using the three lots of four bits output from each interval RAM 12, 13, 14 and interpolating between the endpoints of the enclosing cube, only 4 kilobytes (16×16×16) of cube lookup space is required within the colour conversion RAM 33. FIG. 9 shows an example of how the colour conversion RAM 33 and interpolation processor 16 are used to find a toner value which is a function of R, G and B. First the lookup table finds the "cube" of eight (RGB) points which surround the exact point (either CMY or K) required. In this example the values output from the interval RAMs 12, 13, 14 are (in hexadecimal) 5, 3, and 1, these values are shown in FIG. 9 to select the appropriate enclosing cube. FIG. 10 shows the selected cube. In our example the corner C(0,0,0) represents the value of the toner intensity for (say) cyan when the interval RAM output values for R, G and B are 5, 3 and 1 respectively. Similarly, the corner C100 represents the value of the toner intensity for cyan when the values for R, G and B of the interval RAM's 12, 13, 14 are 6, 3 and 1 (respectively).

At the pixel output rate for common colour printers, the colour conversion data would have to be updated approximately every 75 nanoseconds (ns). In order to obtain the eight vertices, eight reads from a single RAM lookup table would be required. This is not practicable within the required time constraint. The colour conversion RAM 33 is implemented as eight RAMs one for each vertex of the enclosing cube. To save storing duplicate data values in the vertex RAMs, a hardware address remapping scheme is implemented.

Figure 11:
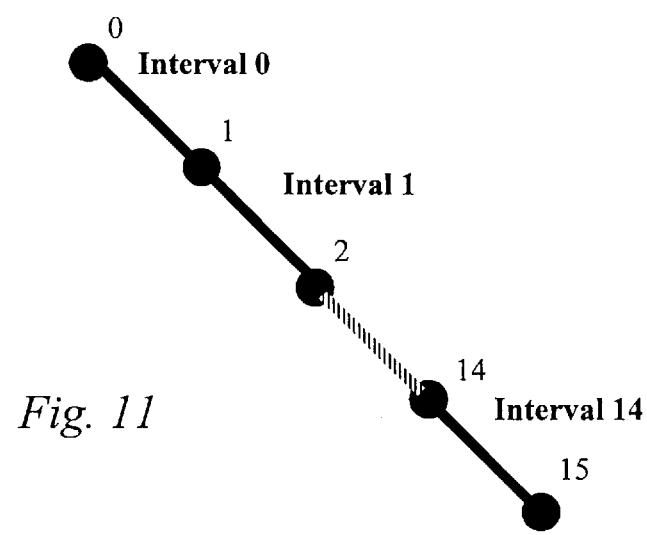
FIG. 11 illustrates an example illustrating the process of address remapping carried out by the colour conversion RAM.

Referring now to FIG. 11 there is shown an example illustrating the process of address remapping carried out by the colour conversion RAM. This example illustrates the case of one-dimensional (1-D) interpolation of a function that has been sampled at sixteen points with two RAMs being used to store the endpoints of the interpolation interval.

The even end points of the interpolation intervals are assigned to the first RAM and the odd grid points to the second RAM. Given a four-bit address (A3–A0) which will select one of the fifteen interpolation intervals, only three address bits are necessary to select one of eight endpoints stored in each RAM. The addresses for the RAM containing the 'odd' endpoints will be the three most significant bits of the four bit address (A3A2A1). The addresses for the RAM containing the 'even' endpoints will be the three most significant bits, with the least significant bit added to this three bit address (i.e. A3A2A1+A0).

Referring to the example in FIG. 11 which it can be shown that the first even_RAM will contain the values corresponding to points {0,2,4,6,8,10,12,14} and the odd_RAM contains the values corresponding to the points {1,3,5,7,9,11, 13,15}. Sequencing through the interpolation intervals, it can be shown that the corresponding RAM addresses will be {0,0},{1,0},{1,1},{2,1 }, . . . etc. So for the interpolation processor 16 which requires its input as a sequence of {left, right} endpoints, it is only needed to perform a swap on the data outputs whenever the least significant bit (LSB) of the interpolation interval address is set, to have the data in the required format.

Figure 13:
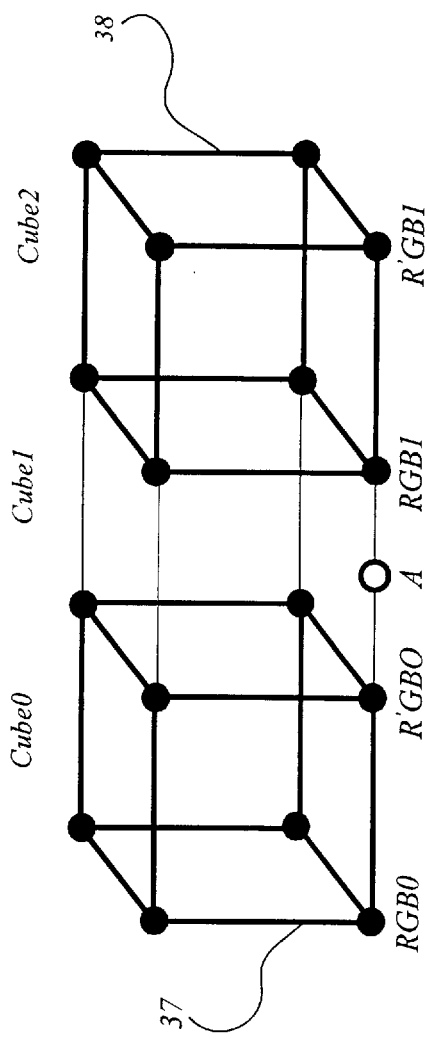
FIG. 13 illustrates a further example showing redundancy removal.
Figure 12:
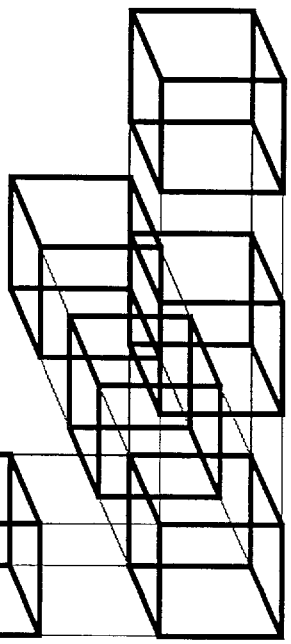
FIG. 12 illustrates a further example showing redundancy removal.

FIG. 12 shows, that by using the above mentioned process in three dimensions only every second cube (in each direction) is required to store all points in the RGB space, thereby avoiding duplicated storage of individual points. FIG. 13 shows the three dimensional process of FIG. 12 with only the red direction shown for clarity. Only values for cube0 37 and cube2 38 are stored in the colour conversion RAM 33. If the point of interest falls in cube0, the "normal" interpolation direction is from RGB0 to R'BG0. If, however, the point A lies in cube1, the RGB corner value is taken from cube2 and the R'GB corner value is taken from cube0. In this case, the interpolation direction along the red axis is reversed to effectively "swap" the two corner values. This can be done by complementing the red LSBs used in looking up the fractional RAM 15 which form part of the first stage of interpolators and will be described more fully below.

Each of the eight corners are stored in separate RAMs. Each RAM is addressed differently in order to access the correct cube. The colour conversion RAM outputs 52 are fed to the interpolation processor 16.

Figure 14:
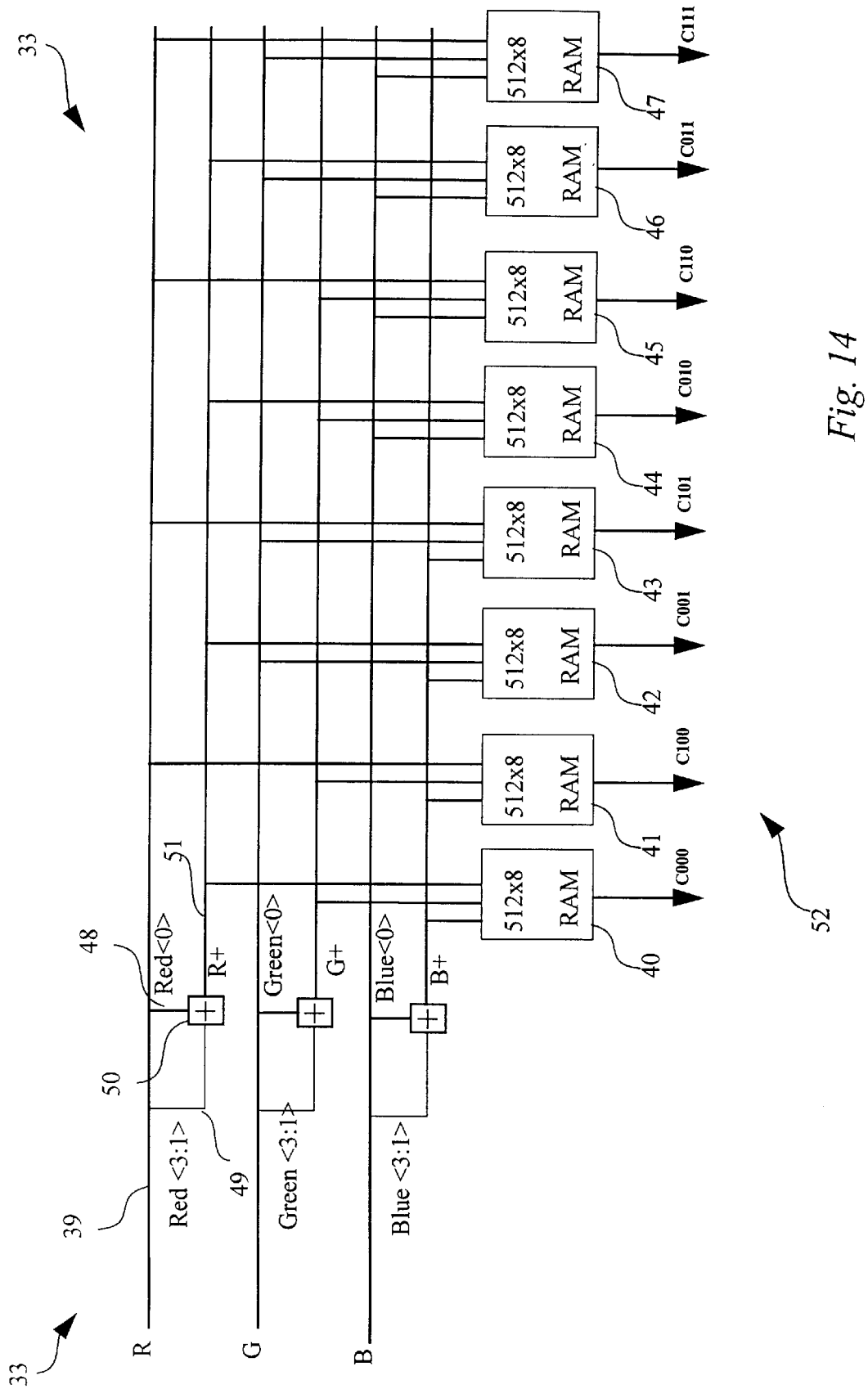
FIG. 14 illustrates the colour conversion RAM.

Referring now to FIG. 14 there is shown the colour conversion RAM, which must output a sequence of {left, right} endpoints. Taking the example of a red input value 39 from the red interval RAM 12, for even RAMs 40, 42, 44, 46, the value of the red interval RAM 12 is used directly to look up the relevant vertex value. In order to determine the address value for the odd value RAMs 40, 42, 44, 46 the lowest bit 48 is taken and added by adder 50 to the upper 3 bits 49 to give the odd RAM address 51.

Returning now to FIG. 4, a fractional RAM 15 is provided which is reloaded by the processor bus interface subsystem 3 for each colour printer pass. The fractional RAM 15 is loaded with values corresponding to the fraction of the interval that each colour value lies on the red axis of FIG. 7. For example, if the red input data point 18 lies one third between the lower red reference point 19 and the upper red reference point 20 then the fractional RAM 15 will output an 8 bit value corresponding to this position. The fractional RAM 15 outputs 8 bits for each colour represented by (u1,u2,u3) to the interpolation processor 16.

Each component of the RGB pixel data passes through a fractional RAM 15 which provides a 8-bit interpolation fraction amount. The co-ordinate triplet is passed onto the interpolation processor 16 for further processing In FIG. 15 an example of interpolation of a point within a cube is shown in which seven interpolators are used to find the final value. The first four interpolate along the R axis (using the R interpolation fraction) to find the colour conversion values at points A1, A2, A3 and A4. The next two interpolate along the G axis between A1 and A2 to find B1 and between A3 and A4 to find B2. The final interpolator interpolates along the B axis to find the point C which forms the final interpolated value 24

Hence, for a point (u1,u2,u3) for which it is desired to know the interpolated function value C(u1,u2,u3), the following series of linear interpolations is carried out:

$$A1 = C(u1,0,0) = (1-u1)*C000 + u1*C100 \quad \text{(EQ 5)}$$

$$A2 = C(u1,0,1) = (1-u1)*C001 + u1*C101 \quad \text{(EQ 6)}$$

$$A3 = C(u1,1,0) = (1-u1)*C010 + u1*C110 \quad \text{(EQ 7)}$$

$$A4 = C(u1,1,1) = (1-u1)*C011 + u1*C111 \quad \text{(EQ 8)}$$

$$B1 = C(u1,u2,0) = (1-u2)*A1 + u2*A3 \quad \text{(EQ 9)}$$

$$B2 = C(u1,u2,1) = (1-u2)*a2 + u2*A4 \quad \text{(EQ 10)}$$

$$C = C(u1,u2,u3) = (1-u3)*B1 + u3*B2 \quad \text{(EQ 11)}$$

where the coordinates within the interpolation cell are normalized to range from 0 to 1.

The result of the tri-linear interpolation computation give the relevant cyan, magenta, yellow or black component. This 8-bit data is used as the input for near-white correction, the next operation of the colour conversion apparatus 2

It must be appreciated that, when output colour space interpolation intervals are determined, it is possible for corresponding intervals to be of different lengths, and accordingly the eight vertices do not define a cube, but rather an arbitrary volume. However each of the volumes are contiguous and fill the entire colour space. Also the re-mapping from one colour space to the other does not necessarily involve re-mapping to a similarly shaped volume. Throughout this specification "cubes" are used for convenience of description and for ease of visualisation of the embodiments.

Figure 15:
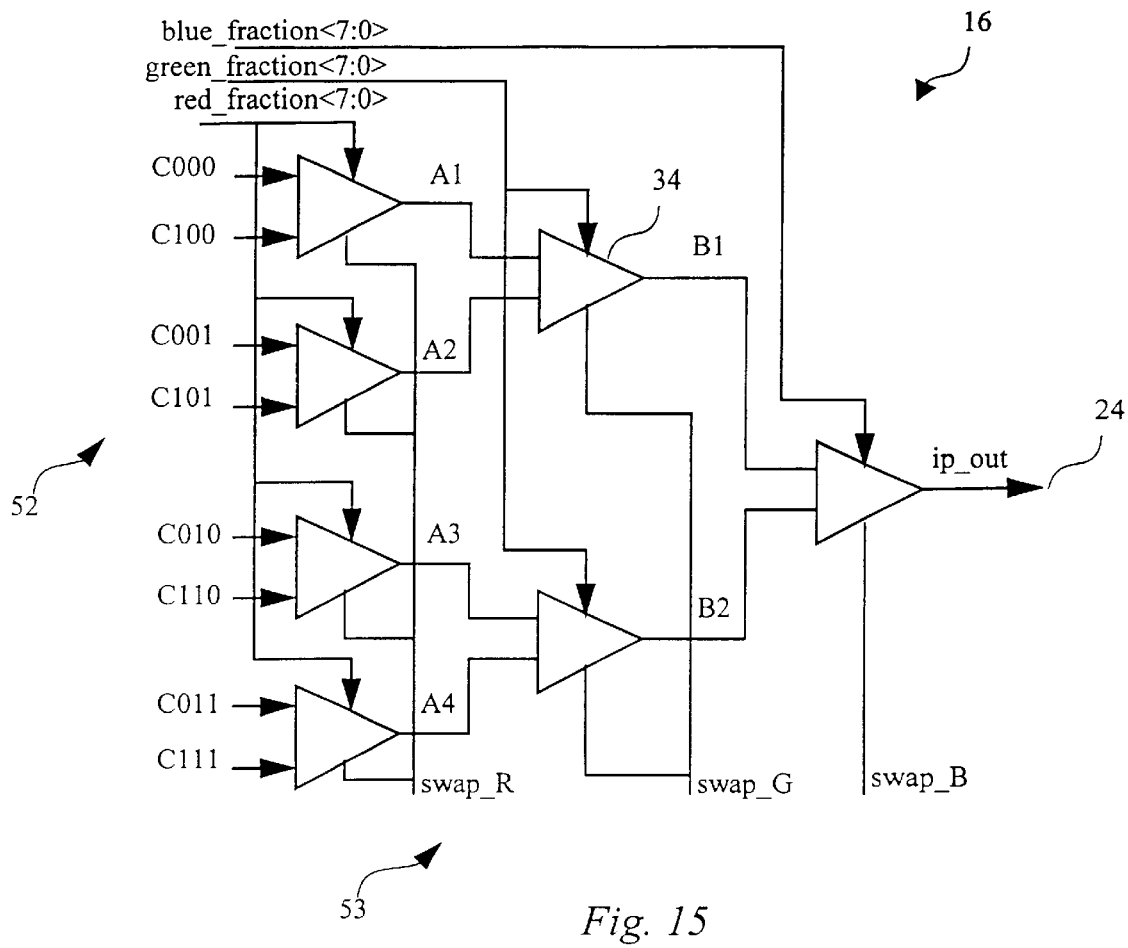
FIG. 15 illustrates the interpolation processor.

FIG. 15 shows the structure of the interpolation processor 16 of FIG. 4. The interpolation processor 16 takes the colour conversion RAM outputs 52 C000 to C111 for points located at the eight vertices of a data point's enclosing cube and the interval swap signals 53 swap_R, swap_G and swap_B. As mentioned previously, the interval swap signals 53 are derived from the least significant bit of respective colour outputs from the non-uniform colour space conversion interval RAM 11 for each colour. Using the three interpolation fractions generated by the fractional RAM 15, the interpolator processor 15 implements the multidimensional interpolation equations outlined above via a series of interpolation processing elements 34 to calculate the required colour conversion values as given in Equation 11.

Figure 16:
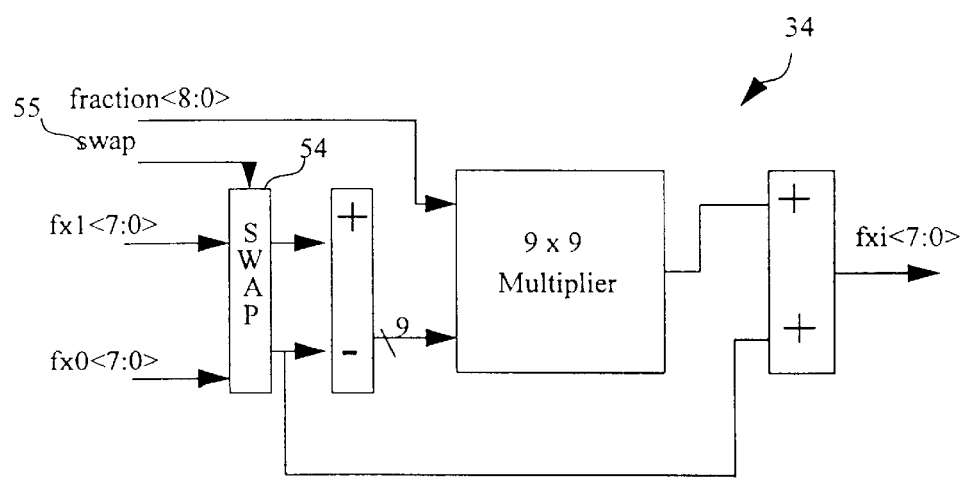
FIG. 16 illustrates the internal structure of an interpolation processing element.

Referring now to FIG. 16 there is shown the internal structure of each interpolation processing element 34. Each interpolation processing element 34 implements a one-dimensional interpolation equation:

$$f(xi) = f(x0) + ((f(x1) - f(x0))*(xi - x0)/(x1 - x0)) \quad \text{(EQ 12)}$$

As mentioned previously it is sometimes necessary to swap the interval inputs around. This is implemented by swap unit 54 under the control of a swap signal 55.

For the first pass of the interpolation-tree, the end-points of the interpolation f(x1), f(x0) are the vertices of the enclosing cube determined by the colour conversion RAM outputs 52. The fractional terms (xi−x0)/(x1−x0) supplied by the fractional RAM 15 represent an 8-bit fractional amount (i.e. normalised between 0 and 1) to interpolate to reach the f(xi) value.

Figure 17:
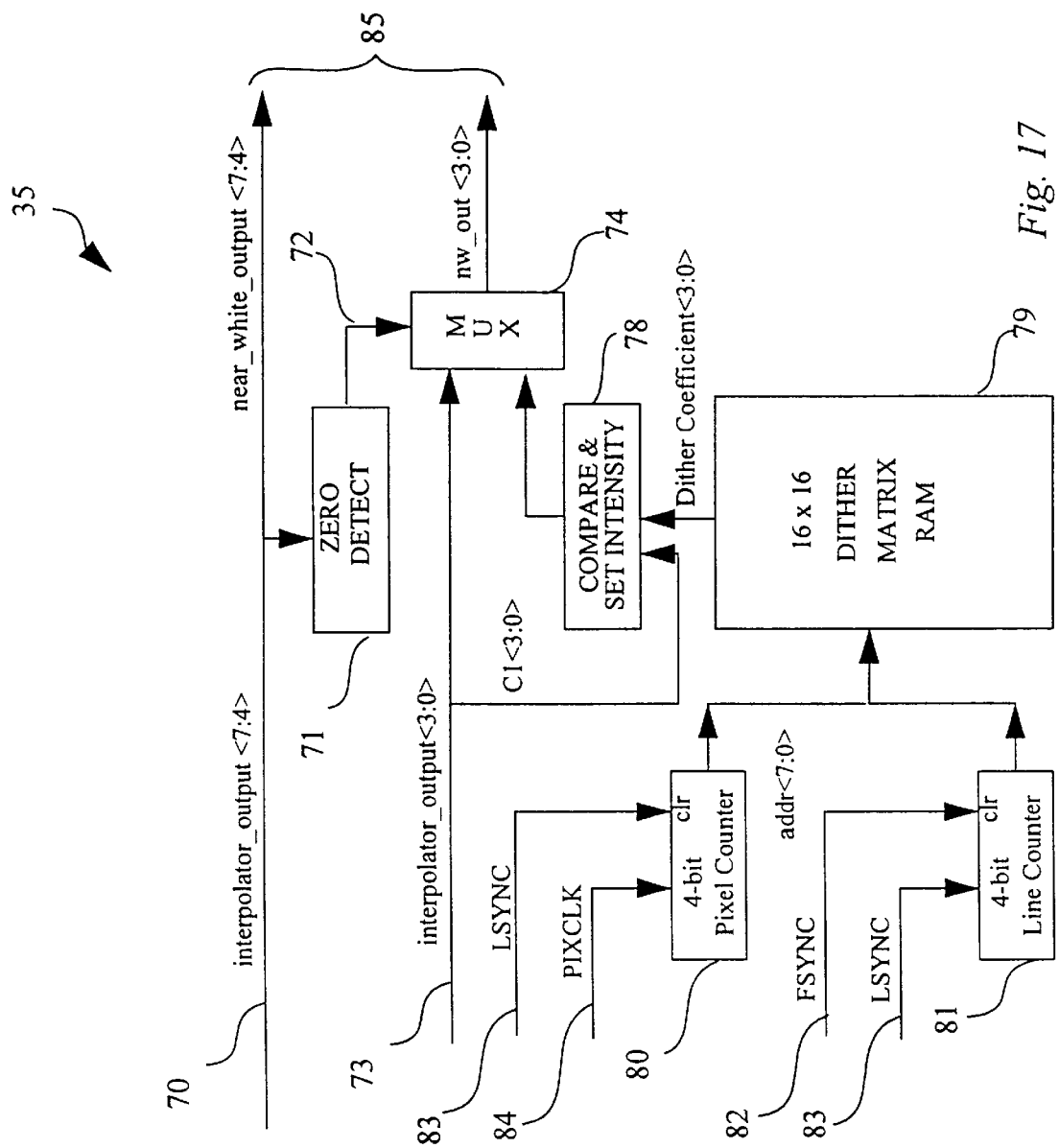
FIG. 17 illustrates the near white correction unit.

Referring now to FIG. 17, there is shown the structure of the near white correction unit 35. The upper 4 bits of colour conversion data 70 output of the interpolation processor 16 are used for input to a zero detection unit 71 which is used to detect possible near white values and outputs a multiplexor selection signal 72 which is used by multiplexor 74 to select the lower four bits of output.

The near white correction unit 35 uses the process of dithering for values in the range of intensities from 0 to 0×0F to increase the perceived dynamic range on the printed output.

In the process of dithering an image, the decision to intensify a particular output location is made dependent on the desired intensity S(x,y) at that particular point and on a predetermined dither matrix value D(i,j). To display the required point at O(x,y), it is necessary to generate $$i = x \text{ modulo } n \qquad (EQ\ 13)$$

$$j = y \text{ modulo } n \qquad (EQ\ 14)$$

Then, if S(x,y)>D(i,j), the point at O(x,y) is intensified, otherwise it is not.

Figure 18:
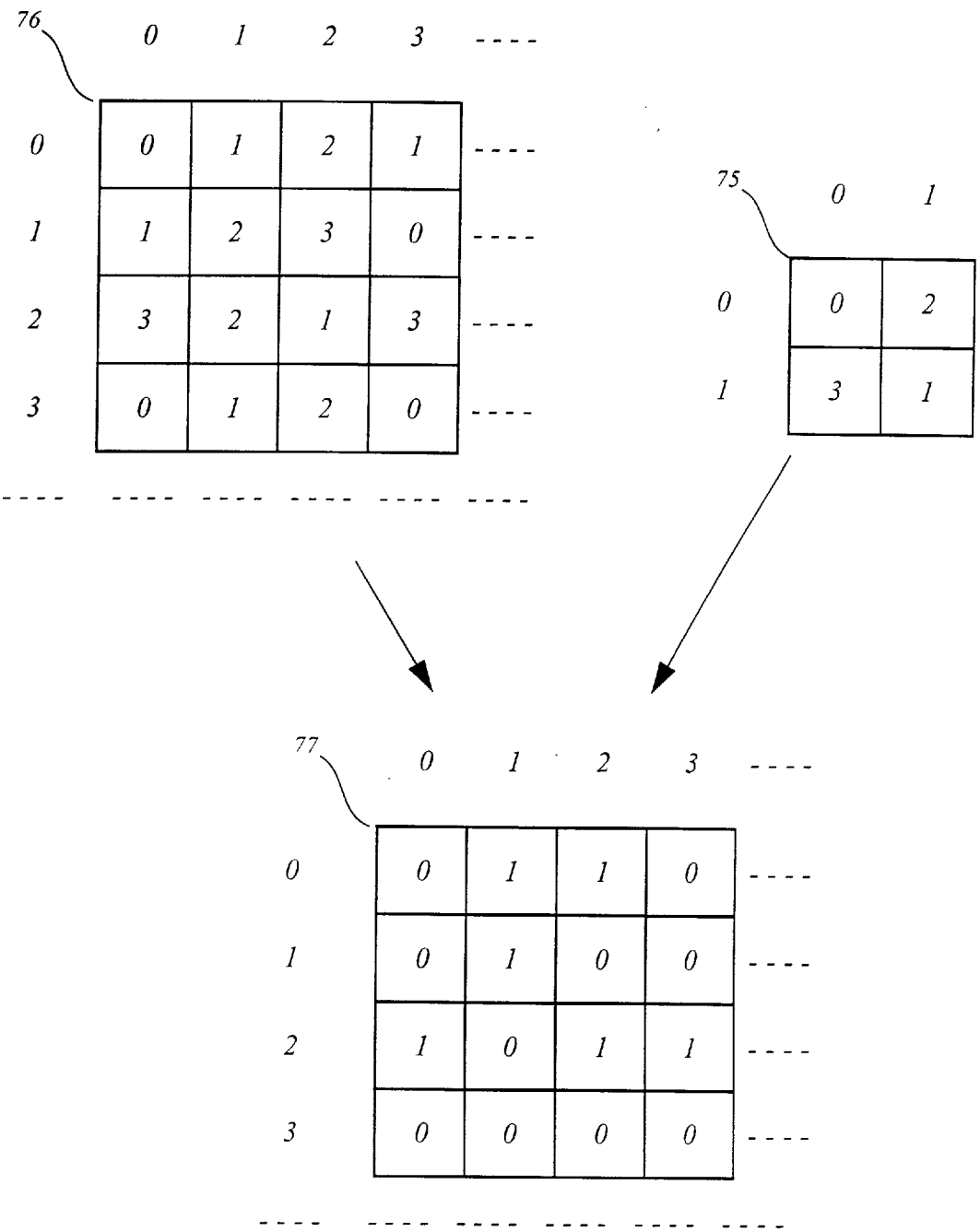
FIG. 18 illustrates an example of 2×2 dithering.

Referring now to FIG. 18, there is shown an example of the dithering process using a 2×2 dither matrix values 75. The input matrix values 76 containing S(x,y), and dither matrix values 75 having locations D(i,j), are used in conjunction with the above intensification rule to produce output matrix values 77 O(x,y) with 0 corresponding to those points that are not intensified, and 1 corresponding to those points that are intensified. Hence, input position S(0,0) with a value of 0, will be compared with D(0,0) which has a value 0 also, and the comparison determination is not satisfied, so the point O(0,0) will not be intensified. Input element S(2,3) with a value of 3, will be matched with dither matrix element D(0,1) since 2 modulo 2=0 and 3 modulo 2=1. D(0,1) has a value 2, so the output element O(2,3) is intensified and so on.

The above example is a sample operation of a dither matrix of size 2×2 elements, for a on or off output. In the preferred embodiment of the present invention, a dither matrix of size 16×16 is used.

The near white correction unit 35 takes the output from the interpolation processor 16 and dithers points with an intensity that is less than or equal to a near white threshold, 0×0F. If the upper 4 bits of colour conversion data 70 correspond to a value greater than the near white threshold, the zero detection unit 71 outputs a multiplexor selection signal 72 such causes the multiplexor 74 to pass the input data unhindered. Otherwise, the zero detection unit 71 output causes the output to be the value provided by the comparison unit 78. The lower 4 bits of input data 73 from the interpolation processor 16 is input to a comparison unit 78 which tests if this data is greater than the dither matrix value fetched from a dither matrix RAM 79. If it exceeds the dither threshold then the near white threshold value is output from a register within the comparison unit 78.

The value output from dither matrix RAM 79 is determined by input index values that are themselves constructed from a 4 bit pixel counter 80 and a 4 bit line counter 81. These counters are maintained to track a pixel's position in the dither matrix.

The 4 bit line counter 81 can be reset at a frame start by a FSYNC signal 82 and counts LSYNC signal 83 pulses. The 4 bit pixel counter 80 can be reset at the line start by the LSYNC signal 83 and will count PIXCLK 84 pulses.

The near white correction unit 35 provides a near white output 85 having it's four most significant bits obtained from the upper 4 bits of colour conversion data 70 output from the interpolation processor 16, and it's four least significant bits obtained from an output of the multiplexor 74.

The near black correction unit 36 aims to sharpen up the edges of text by detecting the transition from black to white or vice versa. When an edge is detected, instead of printing a black made up of, for example, the Cyan, Magenta, Yellow and Black that it would normally comprise, a substantial portion of a single black colour is printed. This has the effect of hiding colour registration errors and removing excess toner around fine black text.

The single colour black is actually a four colour black but with a substantial amount of "under colour removal" (UCR). When a black edge is detected the output is limited to printing a register value within the near black correction unit 36. This register is loaded with a value representing 100% output for the black pass, and say 20% for the other passes. Hence there will be 80% UCR which has been found to produce better results than 100% UCR which tends to produce results that appear too 'thin' when fine lines of text are printed.

Figure 19:
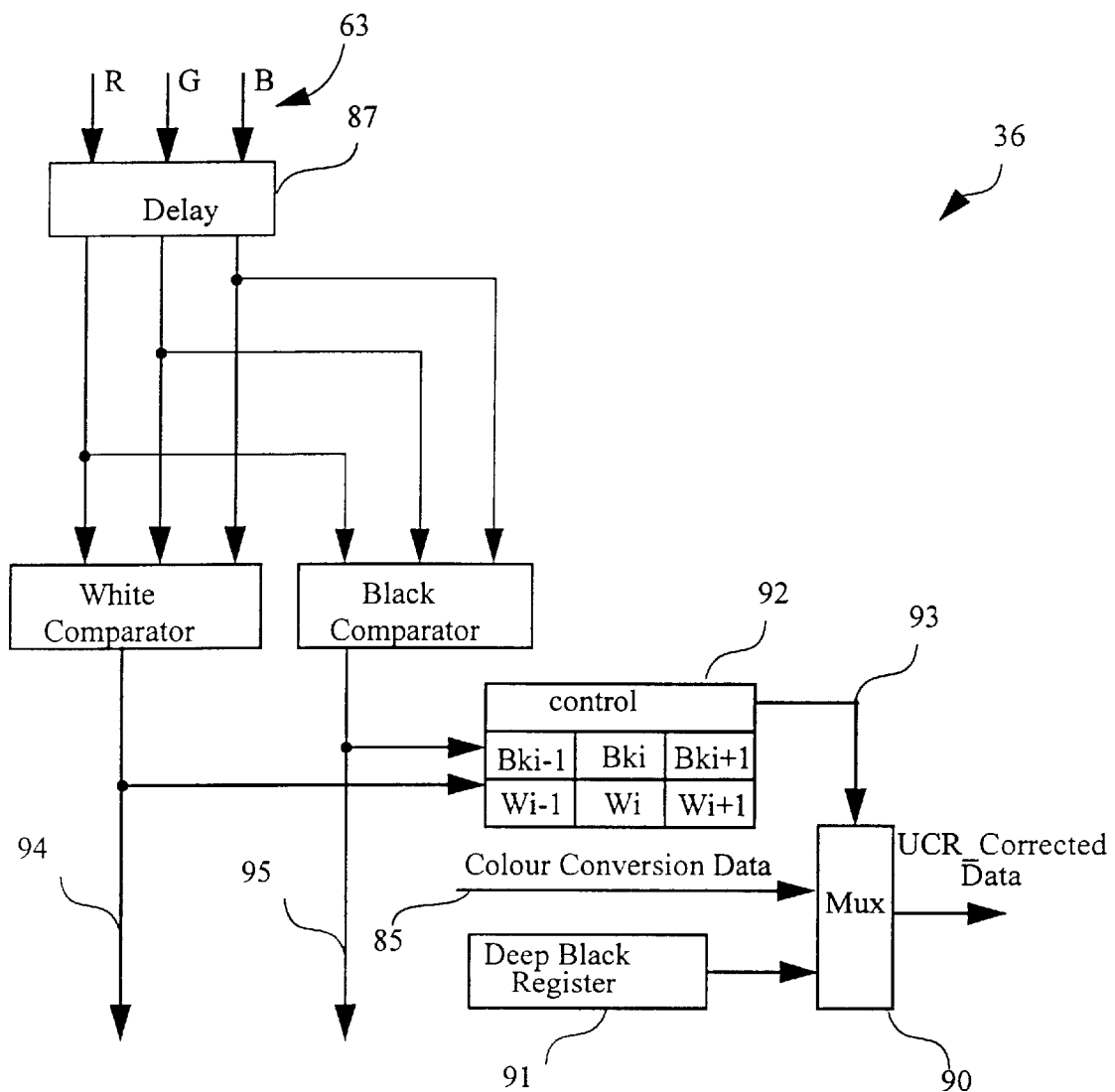
FIG. 19 illustrates the near black correction unit.

Referring now to FIG. 19, the structure of the near black correction unit 36 is shown. The RGB input pixels 88 from the compositing bus 63 are input to a latch and delay unit 87, to be delayed so they are synchronized with colour conversion data obtained from the near white output 85 previously derived from the interpolation processor 16. The near black correction unit 36 detects the case of a black input pixel. If the input pixel is not black then a multiplexor 90 passes the colour conversion data of the near white output 85 (i.e. from the previous pipeline stage) unchanged from its input to its output.

If the current input pixel is black, a near black control unit 92 tests the pixel's immediate neighbours for whiteness. If either of the neighbours are white then the near black control unit 92 considers that it has detected an edge and activates the multiplexor 90 via multiplexor control signal 93 which then selects the contents of a deep black register 91 rather than the near white output 85.

In order to provide some tolerance to noise in the input signal white values are considered to be in the range of R,G,B values being 0×FF–0×FE and black values are set in the range 0×00–0×01. This allows for least significant bit errors during compositing operations prior to colour conversion.

The near black correction unit 36 processor scans a line for the case of a black to white or white to black transition. This enables the detection of horizontal edges. If a system requires the detection of vertical edges then it will be necessary to scan from line to line. Two status signals, a white detect signal 94 and a black detect signal 95 are provided for use for the optional detection of edges in a vertical scanning direction.

Figure 20:
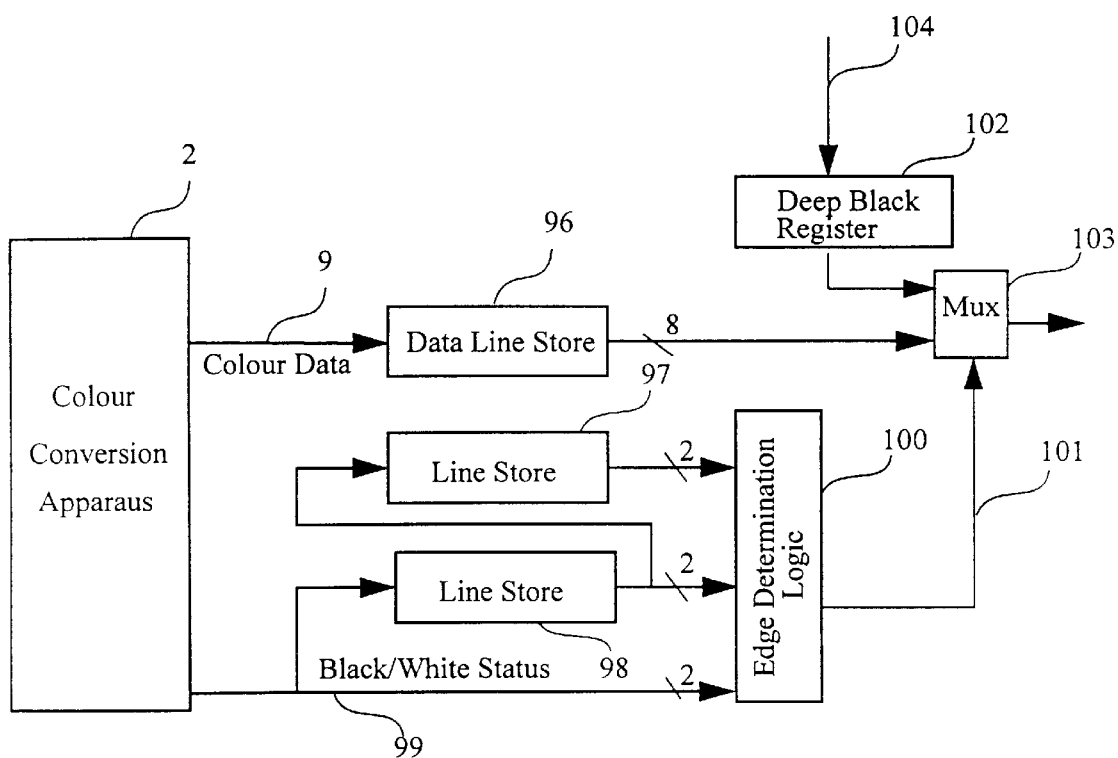
FIG. 20 illustrates text detection using vertical edge scanning.

Referring now to FIG. 20, there is shown an embodiment of a vertical edge detection system, which is ancillary to the colour conversion apparatus 2. One line of colour conversion data comprising the output data 9 is stored in a data line store 96, being the line that is to be colour corrected for text edges. A first line of status information is stored in a first status information store 97, and a second line of status information is stored in a second status information store 98, the store 98 corresponding to the line being written to the data line store 96, and the store 97 to the line previously in the data line store 96. The third line of status information is current status information 99 and comes directly from the colour conversion apparatus 2 (see FIG. 17).

An edge determination logic unit 100 performs the same function as that performed in the near black correction unit 36 in that an edge determination logic unit output signal 101 is high when the output of the second status information store 98 indicates a black pixel, and either the output of the first status information store 97 or the current status information 99 indicates a white pixel. When such a condition occurs a multiplexor 103 outputs the value stored in another deep black register 102 otherwise the colour data from the data line store 96 is output. The deep black register 102 is reloaded via an RBUS input 104, derived from the register bus 5, at each colour data pass of the printer device.

The foregoing describes only a number of embodiments of the present invention, modifications, obvious to those skilled in the art, can be made thereto without departing from the scope of the present invention.

What I claim is:

1. A method of converting an input image in an input colour space to an output image in an output colour space wherein at least one primary colour of said input colour space is divided into a plurality of intervals having endpoints and wherein the output colour space has output colour values corresponding to the endpoints, said method comprising the steps of:

determining, for each input pixel in the input image, the output colour values corresponding to the endpoints closest to the input pixel; and interpolating between said output colour values corresponding to the endpoints closest to the input pixel to derive an output colour value in said output colour space;

wherein said determining step comprises:

storing the output colour values corresponding to said endpoints, wherein output color values corresponding to adjacent endpoints are grouped into different groups; and simultaneously retrieving the output colour values corresponding to the endpoints closest to said input pixel using an offset addressing variable between each one of the groups.

2. A method as claimed in claim 1 wherein the interpolating step further includes determining a distance measure of said input pixel from at least one of said closest endpoints by means of a lookup table.

3. A method as claimed in claim 1 wherein a relationship between the two colour spaces is defined by a transfer function and the input colour space intervals vary in length depending on the behavior of the transfer function.

4. A method as claimed in claim 3 wherein the length of the input colour space intervals is shorter at and about locations where the transfer function undergoes relatively rapid changes in slope.

5. A method as claimed in claim 4 wherein the length of said input colour space intervals is adjusted so that the magnitude of the change in slope of the transfer function between adjacent ones of said input colour space intervals is less than a predetermined value.

6. A method as claimed in claim 5 wherein each primary colour of the input colour space is divided into a plurality of intervals having endpoints so as to form a plurality of volumes of input pixels, with each volume having endpoints as vertices, wherein said storage step comprises:

storing, for each volume, said output colour values corresponding to the vertices of said volume in respective storage means.

7. A method as claimed in claim 6 wherein the output colour space is configured for display by means of a printing system and said input colour space intervals are predetermined based on a transfer characteristic of the printing system.

8. A method as claimed in claim 1 comprising the further step of detecting amongst said output pixels those output pixels having a value near white and altering same to extend a dynamic range of all said output pixels.

9. A method as claimed in claim 8 wherein said altering involves dithering said those pixels over a range of pixel values.

10. A method as claimed in claim 1 comprising the further step of detecting amongst said output pixels those pixels having a value near black and forcing the value of selected ones of said those pixels to black.

11. A method as claimed in claim 1 wherein each of the method steps are repeated for each primary colour component of said output colour space.

12. A method of determining endpoints of an interpolation interval for use in conversion of an input image in an input colour space having a first set of primary colour components to an output image in an output colour space having a second set of primary colour components different from the first set, said method comprising the steps of:

dividing at least one primary colour of said input colour space into a plurality of intervals, storing the endpoints of said plurality of intervals, resolving said intervals into a plurality of groups, with adjacent intervals being resolved into different groups, determining which of said groups include a selected one of said plurality of intervals having a preselected pixel of said image, and simultaneously retrieving the endpoints of said selected one interval using an offset addressing variable between each one of the groups.

13. Colour conversion apparatus for converting an input image in an input colour space to an output image in an output colour space, wherein at least one primary colour of said input colour space is divided into a plurality of intervals having endpoints and wherein, the output colour space has output colour values corresponding to the endpoint, said apparatus comprising:

determining means for determining, for each input pixel in the input image, the output colour values corresponding to the endpoints closest to the input pixel; and interpolating means for interpolating between said output colour values corresponding to the endpoints closest to the input pixel to derive an output colour value in said output colour space;

wherein said determining means comprises:

storage means for storing the output colour values corresponding to said endpoints, wherein output colour values corresponding to adjacent endpoints are group into different groups; and retrieving means for simultaneously retrieving the output colour values corresponding to the endpoints closest to said input pixel using an offset addressing variable between each one of the groups.

14. Colour conversion apparatus as claimed in claim 13 wherein said interpolation means comprises a lookup table for determining a distance measure of said input pixel from at least one of said closest endpoints.

15. Colour conversion apparatus as claimed in claim 14 wherein a relationship between the two colour spaces is defined by a transfer function and the input colour space intervals vary in length depending on the behavior of the transfer function.

16. Colour conversion apparatus as claimed in claim 15 wherein the length of the input colour space intervals is shorter at and about locations where the transfer function undergoes a relatively rapid change in slope.

17. Colour conversion apparatus as claimed in claim 16 wherein the length of said input colour space intervals is adjusted so that the magnitude of the change in slope of the transfer function between adjacent ones of said input colour space intervals is less than a predetermined value.

18. Colour conversion apparatus as claimed in claim 17 wherein each primary colour of the input colour space is divided into a a plurality of intervals having endpoints so as to form a plurality of volumes of input pixels, with each volume having endpoints as vertices, wherein said storage means comprises:

a plurality of memory means for respectively storing, for each volume, said output colour values corresponding to the vertices of said volume.

19. Colour conversion apparatus as claimed in claim 18 wherein the output colour space is configured for display by means of a printing system and said input colour space intervals are predetermined based on a transfer characteristic of the printing system.

20. Colour conversion apparatus as claimed in claim 19 wherein said stored output colour values being changed for each primary colour component of said output colour space, and said interpolating means interpolating the output colour values for each primary colour component.

21. A method as claimed in claim 1, wherein one of said sets comprises red, green and blue primary colour components, and the other said set comprises cyan, magenta and yellow primary colour components.

22. A method as claimed in claim 1, wherein the output colour values corresponding to adjacent endpoints are stored in respective storage means.

23. Colour conversion apparatus as claimed in claim 13, wherein the output colour values corresponding to adjacent endpoints are stored in respective storage means.

24. A method for converting an input image in an input colour space to an output image in an output colour space, each of said images comprising a plurality of pixels comprised of a plurality of primary colour components of the respective colour space, wherein the input colour space is divided into a number of volumes each having m vertices and the output colour space has output colour values corresponding to the vertices of said volumes as interpolation points, said method comprising the steps of:

determining, for each pixel in the input image, the closest interpolation points; and interpolating between said closest interpolation points to derive an output colour value in said output colour space, wherein said determining step comprises:

storing, for each volume, m output colour values corresponding to the m vertices of said volume in m separate storage means; and simultaneously accessing the m storage means and supplying the m output colour values corresponding to the m vertices closest to said input pixel as said closest interpolation points.

25. A method as claimed in claim 24 wherein the interpolating step further includes determining a distance measure of said input pixel component from at least one of said closest interpolation points by means of a lookup table.

26. A method as claimed in claim 24 wherein a relationship between the two colour spaces is defined by a transfer function and said volumes vary in length depending on the behavior of the transfer function.

27. A method as claimed in claim 26, wherein the length of said volumes is shorter at and about locations where the transfer function undergoes a relatively rapid change in slope.

28. A method as claimed in claim 27, wherein the length of said volumes is adjusted so that the magnitude of the change in slope of the transfer function between adjacent ones of said volumes is less than a predetermined value.

29. A method as claimed in claim 24, wherein the output colour space is configured for display by means of a printing system and said volumes are predetermined based on a transfer characteristic of the printing system.

30. A method as claimed in claim 24 wherein the method comprises the further step of detecting amongst said output pixels those output pixels having a value near white and altering same to extend a dynamic range of all said output pixels.

31. A method as claimed in claim 30, wherein said altering involves dithering those output pixels having a value near white over a range of pixel values.

32. A method as claimed in claim 24 wherein the method comprises the further step of detecting amongst said output pixels those pixels having a value near black and forcing the value of selected ones of said those pixels to black.

33. Colour conversion apparatus for converting an input image in an input colour space to an output image in an output colour space, each of said images comprising a plurality of pixels comprised of a plurality of primary colour components of the respective colour space, wherein the input colour space is divided into a number of volumes each having m vertices and the output colour space has output colour values corresponding to the vertices of said volumes as interpolation points, said apparatus comprising determining means for determining, for each pixel in the input image, the closest interpolation points; and interpolating means for interpolating between said closest interpolation points to derive an output colour value in said output colour space, wherein said determining means comprises:

m separate storage means for storing, for each volume, m output colour values corresponding to the m vertices of said volume; and accessing means for simultaneously accessing the m storage means and supplying the m output colour pixels corresponding to the m vertices closest to said input pixel as said closest interpolation points.

34. Colour conversion apparatus as claimed in claim 33 wherein said interpolation means comprises a lookup table for determining a distance measure of said input pixel component from at least one of said closest interpolation points.

35. Colour conversion apparatus as claimed in claim 34 wherein a relationship between the two colour spaces is defined by a transfer function and said volumes vary in length depending on the behavior of the transfer function.

36. Colour conversion apparatus as claimed in claim 35 wherein the length of the volumes is shorter at and about locations where the transfer function undergoes a relatively rapid change in slope.

37. Colour conversion apparatus as claimed in claim 36 wherein the length of said volumes is adjusted so that the magnitude of the change in slope of the transfer function between adjacent ones of said volumes is less than a predetermined value.

38. Colour conversion apparatus as claimed in claim 37 wherein the output colour space is configured for display by means of a printing system and said volumes are predetermined based on a transfer characteristic of the printing system.

* * * * *

UNITED STATES PATENT AND TRADEMARK OFFICE
CERTIFICATE OF CORRECTION

PATENT NO. : 5,809,181

DATED : September 15, 1999

INVENTOR(S) : JAMES ROBERT METCALFE

Page 1 of 2

It is certified that error appears in the above-identified patent and that said Letters Patent is hereby corrected as shown below:

On the title page, item [75]:

<u>INVENTOR</u>

"Collarooy" should read --Collaroy--.

<u>COLUMN 4</u>

Line 11, "ment" should read --ment.--.
Line 18, "he" should read --the--.

<u>COLUMN 7</u>

Line 29, "R'BGD." should read --R'GB0.--.
Line 47, "RAMs 40, 42, 44, 46" should read
   --RAMs 41, 43, 45, 47--.
Line 63, "a" should read --an--.

<u>COLUMN 8</u>

Line 20, "a2" should read --A2--.

<u>COLUMN 9</u>

Line 50, "such" should read --which--.

<u>COLUMN 10</u>

Line 2, "it's" should read --its--.
Line 4, "it's" should read --its--.

UNITED STATES PATENT AND TRADEMARK OFFICE
CERTIFICATE OF CORRECTION

PATENT NO. : 5,809,181

DATED : September 15, 1999

INVENTOR(S): JAMES ROBERT METCALFE

It is certified that error appears in the above-identified patent and that said Letters Patent is hereby corrected as shown below:

<u>COLUMN 12</u>

Line 39, "wherein," should read --wherein--.
    Line 53, "group" should read --grouped--.

<u>COLUMN 13</u>

Line 11, "aa" should read --a--.
    Line 23, "being" should read --are--.

<u>COLUMN 14</u>

Line 29, "comprising" should read --comprising:--.

Signed and Sealed this

Twentieth Day of July, 1999

Attest:

Q. TODD DICKINSON

*Attesting Officer*     *Acting Commissioner of Patents and Trademarks*